(12) United States Patent
Alvarez-Vega

(10) Patent No.: US 6,890,131 B2
(45) Date of Patent: May 10, 2005

(54) METHOD AND APPARATUS FOR MACHINING A WORKPIECE, WHEREBY CHIPS ARE REMOVED FROM THE WORKPIECE

(75) Inventor: Antonio Alvarez-Vega, Stolberg (DE)

(73) Assignee: Durr Ecoclean GmbH, Filderstadt (DE)

( * ) Notice: Subject to any disclaimer, the term of this patent is extended or adjusted under 35 U.S.C. 154(b) by 1 day.

(21) Appl. No.: 10/455,924

(22) Filed: Jun. 6, 2003

(65) Prior Publication Data

US 2004/0013479 A1 Jan. 22, 2004

Related U.S. Application Data

(63) Continuation of application No. PCT/EP02/06552, filed on Jun. 14, 2002.

(30) Foreign Application Priority Data

Jul. 6, 2001 (DE) .......................................... 101 33 003

(51) Int. Cl.⁷ .............................................. B23B 35/00
(52) U.S. Cl. .............................. 408/1 R; 408/56; 408/67
(58) Field of Search ........................... 408/1 R, 56, 60, 408/61, 67; 409/131, 132, 135, 136; 29/563, 564

(56) References Cited

U.S. PATENT DOCUMENTS

| | | | | |
|---|---|---|---|---|
| 2,388,779 A | * | 11/1945 | Boehmler ..................... 470/18 |
| 3,176,387 A | | 4/1965 | Argueso, Jr. et al. |
| 3,828,646 A | * | 8/1974 | Borse et al. ................. 409/136 |
| 4,519,732 A | * | 5/1985 | Sutcliffe ..................... 408/1 R |
| 4,555,047 A | * | 11/1985 | Ackley ......................... 222/192 |
| 4,778,312 A | * | 10/1988 | Boberg et al. ............... 408/1 R |
| 4,854,026 A | | 8/1989 | Averdick et al. |
| 5,009,553 A | * | 4/1991 | Nowman ..................... 408/1 R |
| 5,283,020 A | | 2/1994 | Gasper et al. |
| 6,045,301 A | * | 4/2000 | Kammermeier et al. ...... 408/57 |
| 2002/0085888 A1 | * | 7/2002 | Velpari et al. .............. 408/1 R |

FOREIGN PATENT DOCUMENTS

| | | |
|---|---|---|
| DE | 40 30016 | 4/1991 |
| DE | 44 24 452 A1 | 1/1996 |
| DE | 195 28 429 A1 | 6/1997 |
| EP | 1 166 958 A1 | 1/2002 |

* cited by examiner

Primary Examiner—Daniel W. Howell
(74) Attorney, Agent, or Firm—Leydig, Voit & Mayer Ltd.

(57) ABSTRACT

To provide a method for machining a workpiece, whereby chips are removed from the workpiece, wherein sufficient lubrication of the machining tool and sufficient cooling of the machining tool and the workpiece being machined are ensured, and chips resulting from the machining are simultaneously prevented from remaining inside recesses in the workpiece, a method comprising the following method steps is proposed:

introducing a lubricant in a flowable state into at least one recess of the workpiece;

solidifying the lubricant in the recess;

machining the workpiece, whereby chips are removed from the workpiece, with at least one machining tool coming into direct contact with the lubricant and being lubricated by the lubricant;

transforming the lubricant remaining in the recess of the workpiece into the flowable state and removing the lubricant from the workpiece.

19 Claims, 5 Drawing Sheets

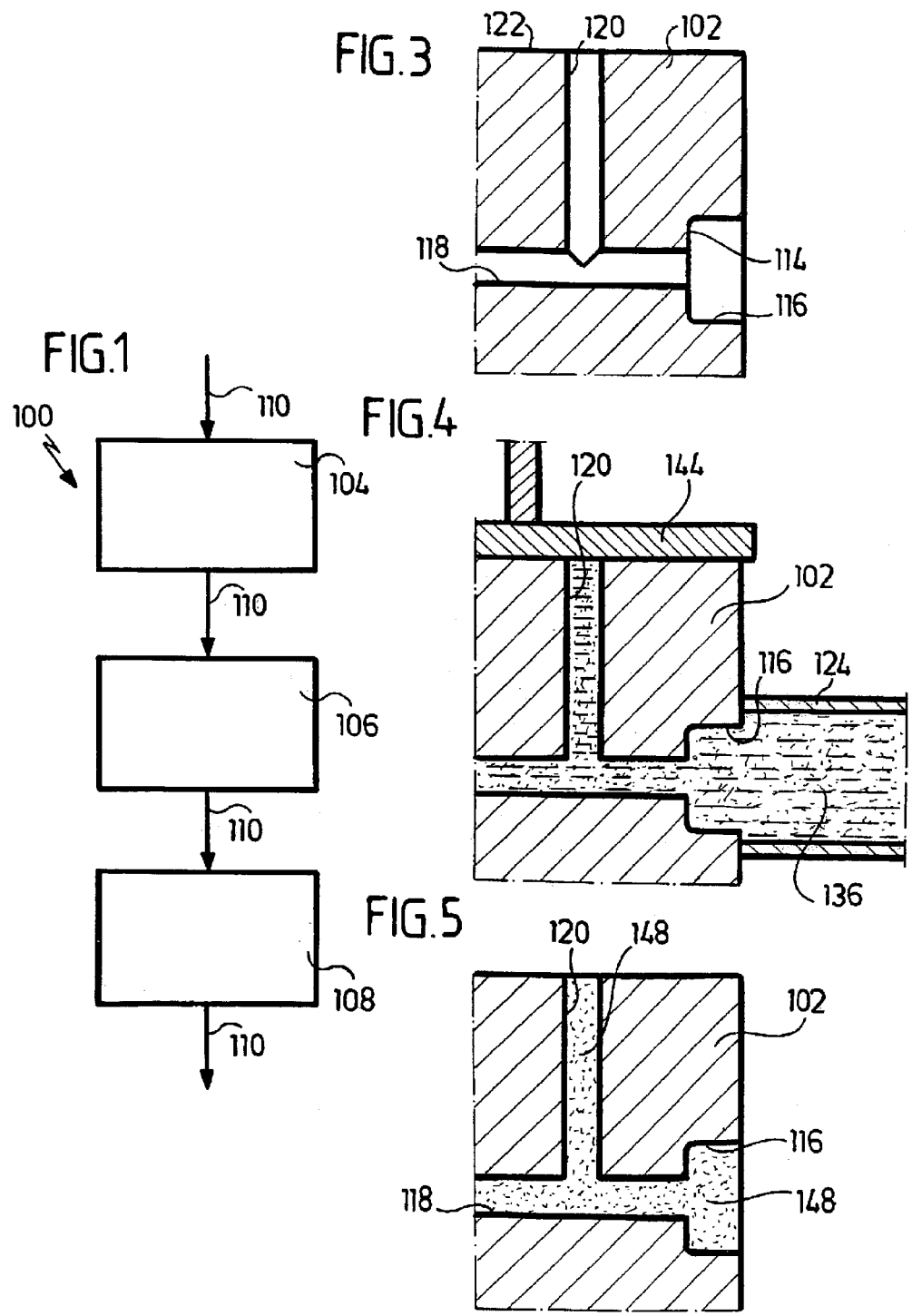

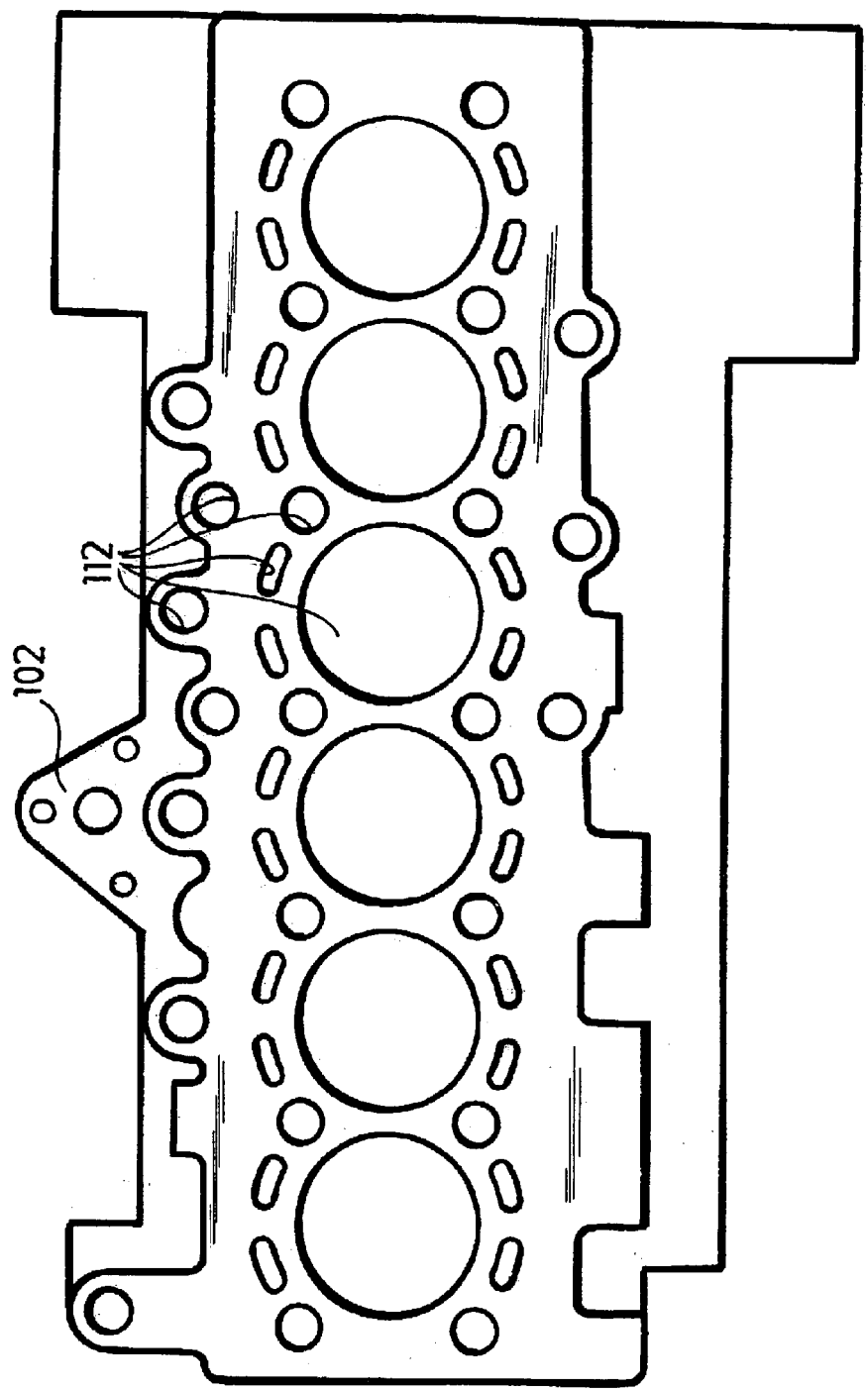

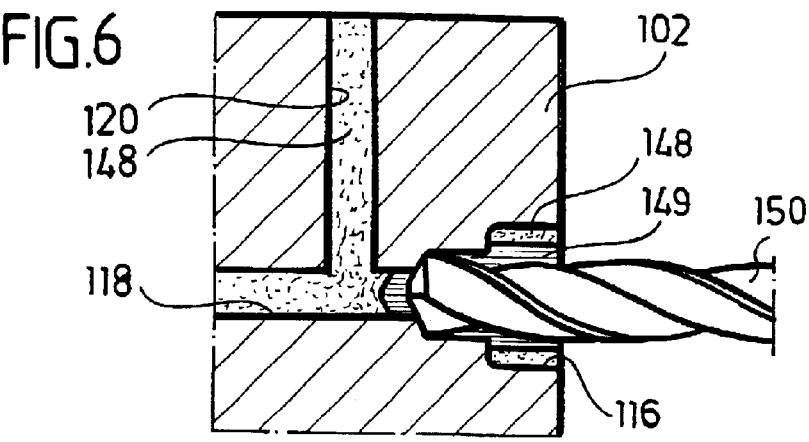
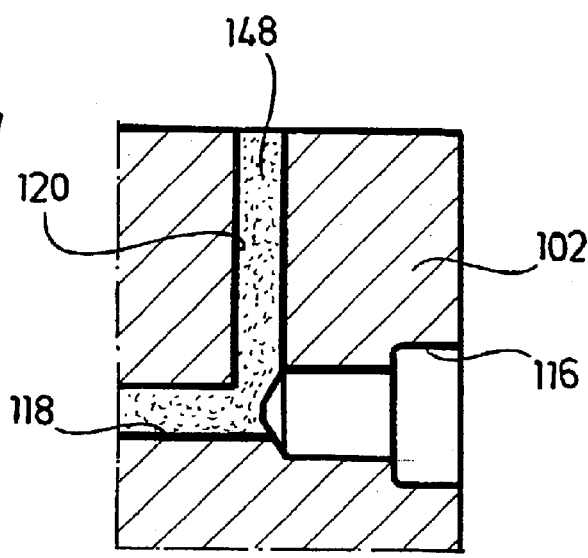
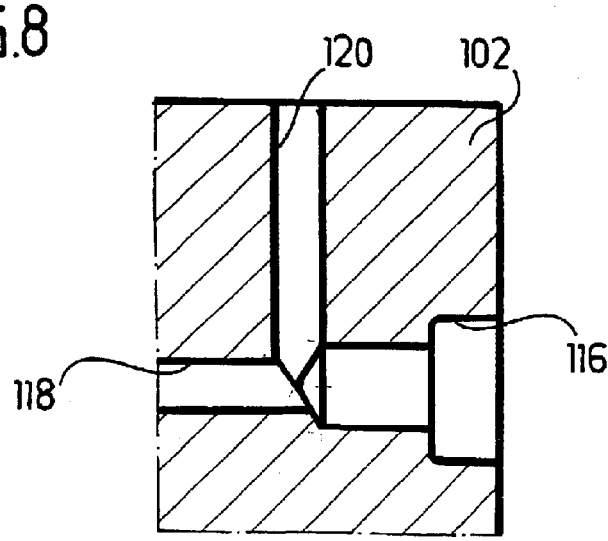

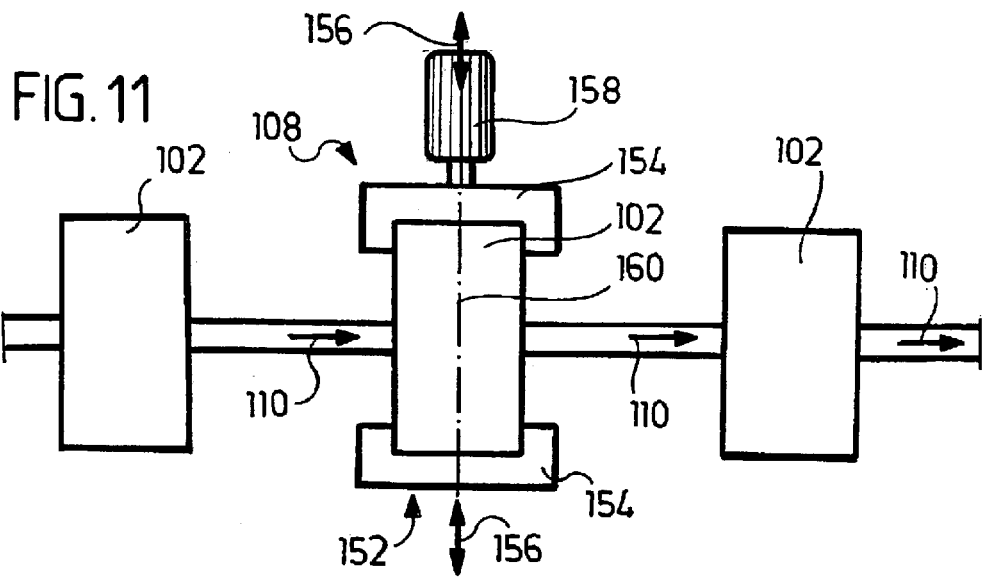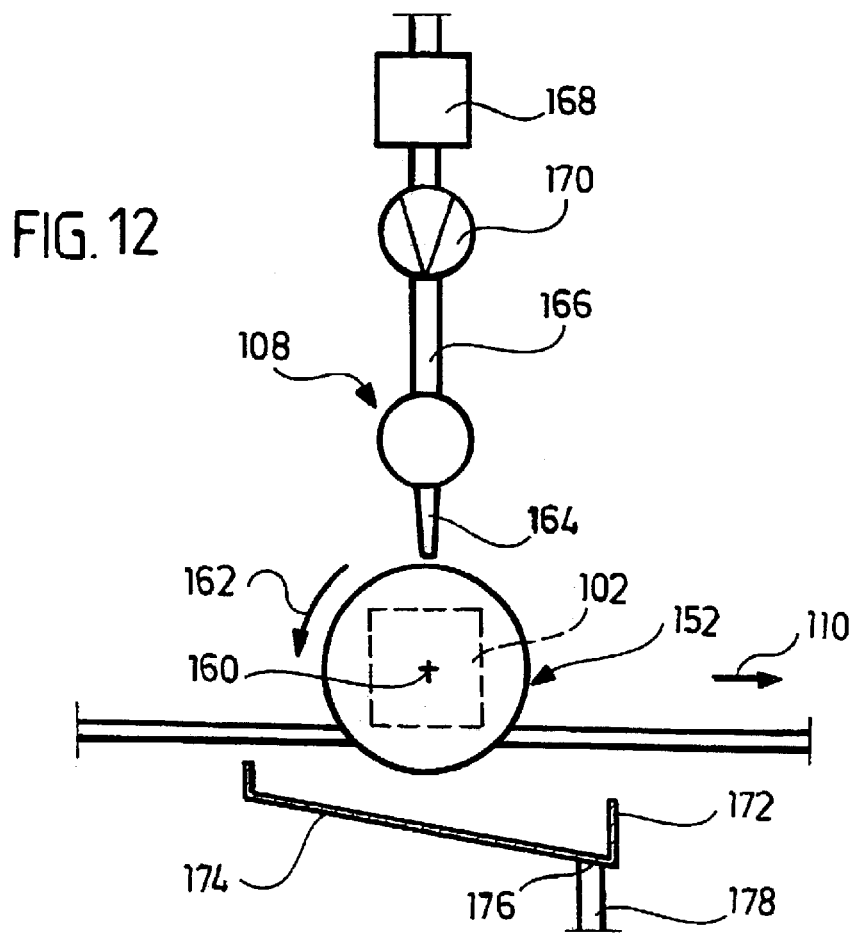

METHOD AND APPARATUS FOR MACHINING A WORKPIECE, WHEREBY CHIPS ARE REMOVED FROM THE WORKPIECE

This application is a continuation of international application PCT/EP02/006552 filed on Jun. 14, 2002, which is incorporated herein by reference in its entirety and for all purposes.

BACKGROUND OF THE INVENTION

The present invention relates to a method for machining a workpiece, whereby chips are removed from the workpiece.

The present invention further relates to an apparatus for machining a workpiece, whereby chips are removed from the workpiece.

During the machining of workpieces, whereby chips are removed from the workpiece, in particular, of workpieces for engine and transmission construction, for example, cylinder heads, crankcases or transmission housings, on transfer lines or in machining centers, very large amounts of liquid coolant are supplied to cool the workpiece and the machining tool, to lubricate the machining tool and to take away the chips removed from the workpiece during the machining.

This conventional lubrication and cooling of the machining tool by external supply of large amounts of liquid coolant has the disadvantage that complicated preparation and circulation systems are required for the large quantities of coolant or coolant emulsion.

Furthermore, it can happen that chips removed during machining of the workpiece are pressed by the coolant supplied under pressure into recesses in the workpiece instead of being taken away from the workpiece.

The object underlying the present invention is, therefore, to provide a method for machining a workpiece, whereby chips are removed from the workpiece, wherein sufficient lubrication of the machining tool and sufficient cooling of the machining tool and the workpiece being machined are ensured, and simultaneously chips resulting from the machining are prevented from remaining inside recesses of the workpiece.

SUMMARY OF THE INVENTION

This object is accomplished, in accordance with the invention, by a method in accordance with claim 1, comprising the following method steps:
  introducing a lubricant in a flowable state into at least one recess of the workpiece;
  solidifying the lubricant in the recess;
  machining the workpiece, whereby chips are removed from the workpiece, with at least one machining tool coming into direct contact with the lubricant and being lubricated by the lubricant;
  transforming the lubricant remaining in the recess of the workpiece into the flowable state and removing the lubricant from the workpiece.

Therefore, with the inventive solution the lubrication of the machining tool is carried out by a lubricant which has already been introduced into the workpiece before the machining with chip removal, which has solidified in the workpiece and which comes into direct contact with the machining tool during the machining with chip removal, in order to lubricate the machining tool.

The lubricant simultaneously absorbs heat generated during the machining of the workpiece with chip removal, so that the machining tool and the workpiece are cooled.

Therefore, an external supply of liquid coolant during the machining of the workpiece with chip removal can be completely or at least partially dispensed with.

Furthermore, it is ensured that the chips resulting from machining the workpiece are not pressed into the recess of the workpiece, as, on the one hand, the recess of the workpiece is filled with the lubricant, and, on the other hand, the chips are not subjected to an externally supplied lubricant with a pressure directed into the interior of the workpiece.

A method for machining a workpiece having a cavity, whereby chips are removed from the workpiece, is known from DE 195 28 429 A1. The workpiece has openings connected to the cavity, and the openings are closed prior to the machining with chip removal by a medium which changes from the liquid to the solid phase in order to prevent machining chips from becoming deposited in the cavity of the workpiece. However, in this known method the medium introduced into the workpiece prior to the machining with chip removal does not come into contact with the machining tool, so that this medium cannot bring about either lubrication or sufficient cooling of the machining tool.

Therefore, with this known method large quantities of liquid coolant have to be supplied during the machining with chip removal, in order to lubricate and cool the machining tool.

A method for preventing machining residues in hollow articles to be machined by removing chips therefrom is known from DE 44 24 452 A1. Prior to the machining with chip removal, the cavities in the workpiece are filled with a foam to prevent chips or other impurities from entering and becoming lodged in the cavities during the machining. However, this foam does not come into contact with the machining tool during the machining of the workpiece with chip removal. Nor does it have any lubricating properties so that the foam introduced into the workpiece cannot bring about lubrication or sufficient cooling of the machining tool. Therefore, in the method according to DE 44 24 452 A1, too, large quantities of coolant must be supplied during the machining with chip removal.

In a preferred embodiment of the method according to the invention provision is made for the lubricant to be introduced in the molten state into the recess of the workpiece.

In this case, solidification of the lubricant in the recess of the workpiece takes place by cooling down the lubricant to below its solidification point.

It is particularly expedient to use a lubricant whose solidification point is higher than approximately 60° C., preferably higher than approximately 65° C. It is thereby ensured that the lubricant will solidify in the workpiece when cooled down to room temperature.

To achieve particularly good lubrication of the machining tool during machining of the workpiece with chip removal it is of advantage to use a lubricant which transforms from the solid to the liquid state during machining of the workpiece by the machining tool.

Moreover, in this case the lubricant absorbs latent heat during transformation from the solid to the liquid state, so that, in addition to lubrication of the machining tool a particularly good cooling of the machining tool and the workpiece being machined is ensured.

As lubricant it is possible to use any substance which is introducible in a flowable state into the workpiece before the machining with chip removal and which is capable of solidifying in the workpiece and has sufficient lubricating properties for the machining tool during the subsequent machining with chip removal.

Provision is preferably made to use a lubricant which comprises a wax, preferably a paraffin wax.

Flooding waxes such as those used in automobile manufacture for flooding vehicle body cavities exposed to corrosion for long-term protection against corrosion are particularly well suited.

If the at least one recess of the workpiece has in addition to the opening for introduction of the lubricant at least one further access opening, then this further access opening is preferably closed by a closure element during introduction of the lubricant into the workpiece, so as to prevent the introduced lubricant from exiting again through this further access opening.

In a preferred embodiment of the method according to the invention provision is made for the closure element to be removed again from the workpiece before machining of the workpiece with chip removal.

Alternatively, provision may, however, also be made for the closure element, for example, a closure plug, to remain on the workpiece during machining of the workpiece with chip removal.

In order to prevent chips from entering unmachined recesses of the workpiece during machining of the workpiece with chip removal, provision may be made for introduction of part of the lubricant, prior to machining of the workpiece with chip removal, into such a recess of the workpiece which is not machined during machining of the workpiece with chip removal.

Introduction of the lubricant into the workpiece, machining of the workpiece and removal of the remaining lubricant from the workpiece can be carried out in one and the same area of an apparatus for machining the workpiece.

However, in order to be able to keep to shorter cycle times in the machining of the workpieces, provision is made in a preferred embodiment of the method according to the invention for the lubricant to be introduced into the at least one recess of the workpiece in a lubricant filler station, for the workpiece to be subsequently conveyed to a machining station, for the workpiece to be subsequently machined in the machining station, whereby chips are removed from the workpiece, for the workpiece to be subsequently conveyed to a lubricant recovery station, and for the lubricant remaining in the workpiece to be subsequently removed from the workpiece in the lubricant recovery station.

In order to remove the lubricant from the workpiece after the machining with chip removal, provision may, in particular, be made for the workpiece to be heated and rotated during and/or after the heating.

The lubricant is made flowable again, in particular melted, by the heating of the workpiece, so that the lubricant can flow out of the recesses of the workpiece.

In a preferred embodiment of the method according to the invention the workpiece is heated by being subjected to a heated fluid, preferably to heated air.

A further object underlying the present invention is to provide an apparatus for machining a workpiece, whereby chips are removed from the workpiece, which makes it possible in a simple way to lubricate the machining tool and to sufficiently cool the machining tool and the workpiece being machined without chips resulting from the machining by chip removal remaining in the workpiece.

This object is accomplished, in accordance with the invention, by an apparatus in accordance with Claim 13 comprising:

a filler device for introducing a lubricant in a flowable state into at
    least one recess of the workpiece;
    at least one machining tool for machining the workpiece, whereby chips are removed from the workpiece, with the machining tool coming into direct contact with the lubricant during the machining and being lubricated by the lubricant; and
    a device for transforming the lubricant remaining in the workpiece into the flowable state and removing the lubricant from the workpiece.

The advantages of the apparatus according to the invention have already been explained hereinabove in conjunction with the advantages of the method according to the invention.

Further features and advantages of the invention are the subject matter of the following description and the drawings of an embodiment.

BRIEF DESCRIPTION OF THE DRAWINGS

FIG. 1 a schematic illustration of an apparatus for machining a workpiece, whereby chips are removed from the workpiece, comprising a wax filler station, a machining station and a wax recovery station;

FIG. 2 a schematic plan view of a workpiece which is to be machined in the apparatus of FIG. 1;

FIGS. 3 to 8 schematic sections through a partial area of the workpiece of FIG. 2, which illustrate successive steps for machining the workpiece in the apparatus of FIG. 1;

FIG. 11 a schematic plan view of the wax recovery station of the apparatus of FIG. 1; and FIG. 12 a schematic side view of the wax recovery station of the apparatus of FIG. 1.

DETAILED DESCRIPTION OF THE INVENTION

Figure 9:
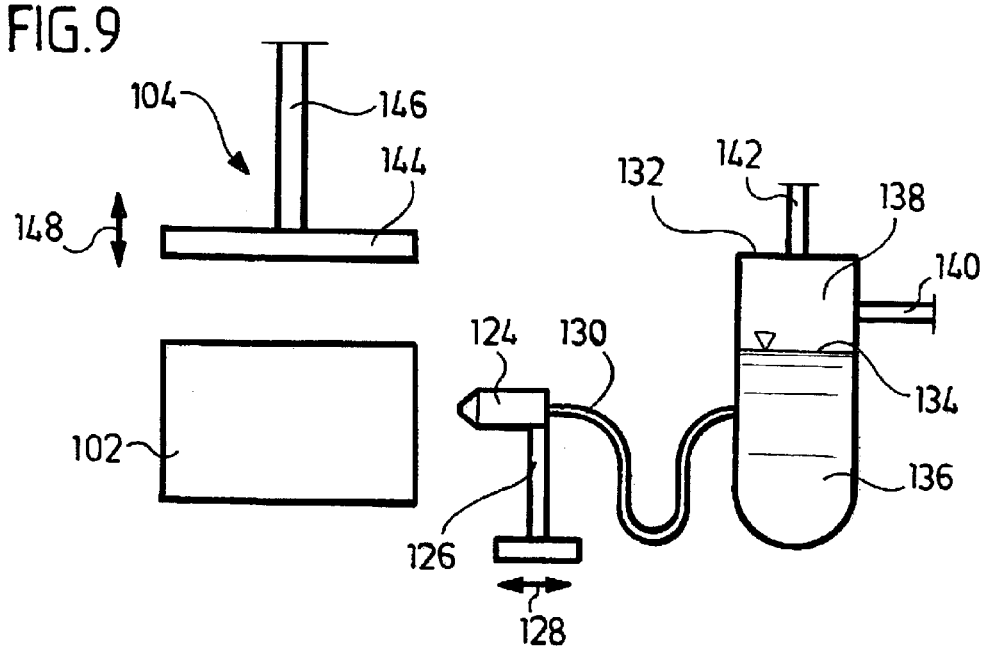
FIG. 9 a schematic illustration of the wax filler station of the apparatus of FIG. 1, before introduction of the wax into the workpiece.

Identical or functionally equivalent elements are designated by the same reference numerals in all Figures.

An apparatus generally designated 100, which is illustrated in FIGS. 1 and 9 to 12, for machining a workpiece 102 shown in FIG. 2, whereby chips are removed from the workpiece, comprises, as is best seen from FIG. 1, a wax filler station 104, a machining station 106, and a wax recovery station 108 and also a conveyor device (not shown) for conveying the workpieces 102 along the conveying direction 110 into the apparatus 100, through the three stations 104, 106 and 108 and out of the apparatus 100.

The workpieces 102 can be conveyed, for example, by hoisting beams or push rods on a roller conveyor.

The workpieces 102 which are to be conveyed through the apparatus 100 and machined therein are, for example, engine blocks of an internal combustion engine (see FIG. 2) and have a plurality of recesses 112 extending through the workpiece 102 or ending in the workpiece 102.

Such recesses may, for example, be coolant openings, oil supply bores or threaded bores.

Some of the recesses 112 are insulated from the other recesses; other recesses 112 communicate with one another.

FIG. 3 shows a section through part of the workpiece 102 in which a first bore hole 118 opening into the bottom 114 of a hollow 116 of the workpiece 102 and a second bore hole 120 running perpendicularly into the first bore hole 118 and opening at its end remote from the first bore hole 118 into an upper face 122 of the workpiece 102 are recognizable.

The workpiece 102 is conveyed by the conveyor device into the wax filler station 104 of the apparatus 100 and stopped there in a wax filling position.

Figure 10:
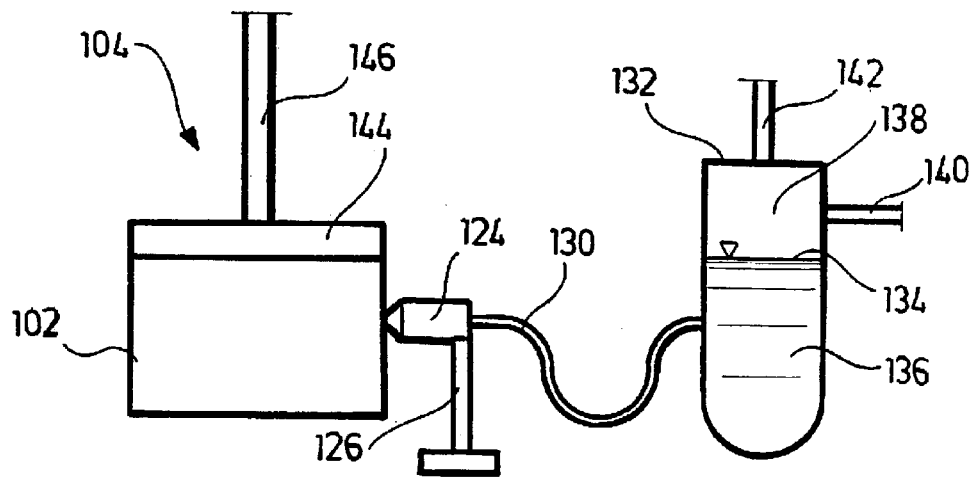
FIG. 10 a schematic illustration of the wax filler station of the apparatus of FIG. 1 while introducing the wax.

As is apparent from FIG. 9, the wax filler station 104 comprises at least one wax filler nozzle 124 held on a displaceable holder 126 which is displaceable by a displacement device (not shown) along the direction of the double arrow 128 between a position of rest (shown in FIG. 9) and a wax filling position (shown in FIG. 10).

The wax filler nozzle 124 is connected via a flexible wax feed line 130 to a wax storage container 132 which is filled up to a level 134 with liquid wax 136.

Into the air space 138 remaining above the liquid wax 136 inside the wax storage container 132 there opens a wax supply pipe 140 via which liquid wax can be supplied to the wax storage container 132 from a wax ring line or a wax reservoir, and a compressed air line 142 via which the interior of the wax storage container 132 can be subjected to an increased air pressure in order to convey liquid wax from the wax storage container 132 through the wax feed line 130 into the wax filler nozzle 124.

In the position of rest of the wax filler station 104 shown in FIG. 9 the compressed air line 142 is closed by a stop valve (not shown).

The wax filler station 104 further comprises at least one closure element 144, for example, in the form of a closure plate, which is held on a displaceable holder 146, which is displaceable by a displacement device (not shown) along the direction of the double arrow 148 between the position of rest shown in FIG. 9 and a closed position shown in FIG. 10.

After the workpiece 102 has been conveyed into the wax filler station 104 and stopped there, the wax filler nozzle 124 is moved by the displaceable holder 126 into the work position shown in FIG. 10, in which the wax filler nozzle 124 rests against an outer face of the workpiece 102 and the outlet opening of the wax filler nozzle 124 covers the hollow 116 into which the first bore hole 118 opens (see FIG. 4).

Furthermore, the closure element 144 is brought by the displaceable holder 146 into the closed position shown in FIG. 10 in which the closure element 144 closes the orifice of the second bore hole 120 on the upper face 122 of the workpiece 102 (see FIG. 4).

The interior of the wax storage container 132 is subsequently subjected to an increased pressure by opening the compressed air line 142, so that liquid wax 136 passes through the wax feed line 130 and the wax filler nozzle 124 into the hollow 116, into the first bore hole 118 and from there into the second bore hole 120 communicating with the first bore hole 118.

During this wax flooding procedure, the closure element 144 prevents liquid wax from passing out of the workpiece 102 through the orifice of the second bore hole 120.

After flooding of the first bore hole 118 and recesses in the workpiece 102 communicating therewith, the wax filler nozzle 124 is moved into a further work position on a further bore hole which is to be filled with wax, in order to also flood this further bore hole with wax.

When all cavities of the workpiece 102 that are to be flooded have been filled with wax, the wax filler nozzle 124 is returned to its position of rest.

Furthermore, the closure element 144 is also returned to its position of rest.

Instead of successively flooding several cavities of the workpiece 102 with the same wax filler nozzle 124, provision may also be made for the wax filler station 104 to comprise several wax filler nozzles 124 so as to able to simultaneously flood several cavities of the workpiece 102.

These several wax filler nozzles may be connected to the same wax storage container 132 or to various wax storage containers 132.

Furthermore, while the wax is being filled in it is possible for the closure element 144 to be moved from the first closed position into one or several further closed positions on the workpiece 102, so as to close orifices of the workpiece 102 communicating with the respectively filled cavity of the workpiece 102.

It is, furthermore, possible for the wax filler station 104 to comprise several closure elements 144 which are used to close different orifices of cavities of the workpiece 102 during the wax filling procedure.

Finally, provision may also be made for moving and/or rotating the workpiece 102 into different wax filling positions relative to the wax filler nozzle 124 and the closure element 144 instead of moving the wax filler nozzle 124 and the closure element 144.

After filling the liquid wax into the first bore hole 118 and the second bore hole 120, the wax cools down to below its melting temperature and solidifies so that the solidified wax 148 remains in the workpiece 102 during subsequent transportation of the workpiece 102 out of the wax filler station 104 to the machining station 106 (see FIG. 5).

After the workpiece 102 has been conveyed by the conveyor device into the machining station 106 of the apparatus 100 and stopped there in a machining position, the workpiece is machined and chips thereby removed from the workpiece by machining tools located in the machining station 106.

Such machining with chip removal may, for example, be carried out with a drilling device comprising a drill 150 which is introduced into the hollow 116 of the workpiece 102 to widen the outer section of the first bore hole 118 (see FIG. 6).

The solidified wax located in the hollow 116 and in the first bore hole 118 is at least partially heated beyond its melting temperature and melted owing to the heat generated during the machining of the workpiece 102 with chip removal.

The molten wax 149 comes into direct contact with the machining tool, for example, the drill 150 during the machining with chip removal, and the machining tool is thereby simultaneously lubricated and cooled by the molten wax 149.

The cooling effect of the wax is intensified by the wax absorbing latent heat during the melting.

The wax located in the remaining cavities of the workpiece 102, which do not come into direct contact with the machining tool, prevents chips resulting from the machining of the workpiece 102, whereby chips are removed from the workpiece 102, from entering these further cavities, for example, the second bore hole 120.

A suitable wax for flooding the cavities in the workpiece 102 is, for example, comprised of paraffin waxes and long-chain hydrocarbons.

Such a wax is sold, for example, by the firm of Pfinder GmbH & Co., Rudolph-Diesel-Strasse 14, in 71032 Boeblingen, Germany, under the designation "Flutwachs AP 2220/1".

This flooding wax has a solidifying point of approximately 69° C. and is kept in the liquid state in the wax storage container 132 preferably at a temperature of from approximately 115° C. to approximately 120° C.

After completion of the machining of the workpiece 102, whereby chips are removed from the workpiece 102, and removal of the machining tool from the workpiece 102, the wax remaining in the workpiece 102 cools down again to below its solidifying temperature and solidifies (see FIG. 7).

The finished workpiece 102 is conveyed by the conveyor device to the wax recovery station 108 shown in FIGS. 11 and 12 and stopped there in a work position.

As is apparent from FIG. 11, the wax recovery station 108 comprises a rotary device 152 with two rotary holders 154, which are displaceable by displacement devices (not shown) along the directions of the double arrows 156 in FIG. 11 from a position of rest (not shown) to a work position in which the respective workpiece 102 is non-rotatably held on the rotary holders 154.

At least one of the rotary holders 154 is drivable by a rotary drive 158 for continuous rotary movement about an axis of rotation 160 of the rotary device 152 in the direction of rotation indicated by arrow 162 in FIG. 12.

A blow nozzle 164 is arranged above the rotary device 152 and outside the interference circle of the rotary holders 152. The blow nozzle 164 is supplied with heated air at elevated pressure via an air supply line 166 in which an air heater 168 and a blower 170, for example, a lateral channel compressor, are arranged.

A drip pan 172 is arranged below the rotary device 152 for collecting wax dripping from the workpiece 102.

The bottom wall 174 is at an incline to an outlet opening 176 at which a wax discharge line 178 opens into the drip pan 172.

The drip pan is heatable by a heating device (not shown) in order to keep the wax dripping into it liquid.

After the workpiece 102 has been deposited between the rotary holders 154, the rotary holders 154 are driven up to the workpiece 102 so as to non-rotatably receive the workpiece 102.

The workpiece 102 is subsequently rotated by the rotary drive 158 about the axis of rotation 160 of the rotary device 152 which coincides with the longitudinal axis of the workpiece 102.

During this, air drawn in from the environment is heated by the air heater 168 to a temperature of from approximately 150° C. to approximately 200° C. and conveyed by the blower 170 to the blow nozzle 164 from whose blow slot heated air is blown at increased speed onto the workpiece 102.

The workpiece 102 and the wax contained therein are heated up by the action of the heated blow air thereon, so that the wax liquefies and owing to gravity drips through the orifices of the cavities of the workpiece 102 respectively located underneath into the drip pan 172.

By rotating the workpiece 102 while it is being acted upon by the heated air, each orifice of the workpiece 102 is made to point at least once downwards into the drip pan 172.

The rotational speed of the rotary device 152 is selected such that each orifice remains directed for a sufficiently long time at the drip pan 172 so as to enable the wax contained in the cavity of the workpiece 102 belonging to the orifice to run out completely.

The liquid wax collected in the drip pan 172 is conducted away for further use by the wax discharge line 178, for example, returned to the wax storage container 132 of the wax filler station 104.

When all of the wax present in the workpiece 102 has been removed from the workpiece 102, the rotational movement of the workpiece 102 about the axis of rotation 160 is stopped, and the workpiece 102 is released by moving the rotary holders 154 into their positions of rest and conveyed by the conveyor device along the direction of conveyance 110 out of the apparatus 100 for further machining or storage.

What is claimed is:

1. A method for machining a workpiece, whereby chips are removed from the workpiece, comprising the following:
   introducing a lubricant in a flowable state into at least one recess of the workpiece;
   solidifying the lubricant in the recess;
   machining the workpiece, whereby chips are removed from the workpiece, with at least one machining tool coming into direct contact with the lubricant and being lubricated by the lubricant, and the lubricant transforming from a solid to a liquid state during machining of the workpiece by the machining tool;
   transforming the lubricant remaining in the recess of the workpiece into a flowable state and removing the lubricant from the workpiece.

2. The method in accordance with claim 1, wherein the lubricant is introduced in the molten flowable state into the recess of the workpiece.

3. The method in accordance with claim 1, wherein the introducing step comprises using a lubricant whose solidification point is higher than approximately 60° C.

4. The method in accordance with claim 1, wherein the introducing step comprises using a lubricant which comprises a wax.

5. The method in accordance with claim 1, wherein the at least one recess comprises an opening for introduction of the lubricant and at least one further access opening which is closed by a closure element during introduction of the lubricant.

6. The method in accordance with claim 5, wherein the closure element is removed from the workpiece prior to machining of the workpiece.

7. The method in accordance with claim 5, wherein the closure element remains on the workpiece during machining of the workpiece.

8. The method in accordance with claim 1, wherein prior to machining of the workpiece, a portion of the lubricant is introduced into a recess of the workpiece, which is not machined during machining of the workpiece.

9. The method in accordance with claim 1, wherein the lubricant is introduced into the at least one recess of the workpiece in a lubricant filler station, the workpiece is subsequently conveyed to a machining station, the workpiece is subsequently machined in the machining station, whereby chips are removed from the workpiece, the workpiece is subsequently conveyed to a lubricant recovery station, and the lubricant remaining in the workpiece is subsequently removed from the workpiece in the lubricant recovery station.

10. The method in accordance with claim 1, wherein the lubricant is removed from the workpiece by the workpiece being heated and rotated during the heating or rotated after the heating or rotated both during and after the heating.

11. The method in accordance with claim 10, wherein the workpiece is heated by being subjected to a heated fluid.

12. The method in accordance with claim 1, wherein the introducing step comprises using a lubricant whose solidification point is higher than approximately 65° C.

13. The method in accordance with claim 1, wherein the introducing step comprises using a lubricant which comprises a paraffin wax.

14. The method in accordance with claim 10, wherein the workpiece is heated by being subjected to heated air.

15. A method for machining a workpiece, whereby chips are removed from the workpiece, comprising the following:
   introducing a lubricant in a flowable state into at least one recess of the workpiece;
   solidifying the lubricant in the recess;
   machining the workpiece, whereby chips are removed from the workpiece, with at least one machining tool coming into direct contact with the lubricant and being lubricated by the lubricant;
   transforming the lubricant remaining in the recess of the workpiece into a flowable state by melting the lubricant, and removing the lubricant from the workpiece.

16. A method for machining a workpiece, whereby chips are removed from the workpiece, comprising the following:
   introducing a lubricant in a flowable state into at least one recess of the workpiece, which comprises an opening for introduction of the lubricant and at least one further access opening which is closed by a closure element during introduction of the lubricant;
   solidifying the lubricant in the recess;
   machining the workpiece, whereby chips are removed from the workpiece, with at least one machining tool coming into direct contact with the lubricant and being lubricated by the lubricant;
   transforming the lubricant remaining in the recess of the workpiece into a flowable state and removing the lubricant from the workpiece.

17. An apparatus for machining a workpiece having at least one recess and utilizing a lubricant having a flowable and liquid state, and a solid state. whereby chips are removed from the workpiece, comprising:
   a filler device for introducing the lubricant in the flowable state into the at least one recess of the workpiece;
   at least one machining tool for machining the workpiece, whereby chips are removed from the workpiece, with the machining tool coming into direct contact with the lubricant during the machining and being lubricated by the lubricant, and with the lubricant transforming from the solid to the liquid state during machining of the workpiece by the machining tool; and
   a device for transforming the lubricant remaining in the workpiece into the flowable state and removing the lubricant from the workpiece.

18. An apparatus for machining a workpiece having at least one recess and utilizing a lubricant having a flowable and liquid state, and a solid state. whereby chips are removed from the workpiece, comprising:
   a filler device for introducing the lubricant in the flowable state into the at least one recess of the workpiece;
   at least one machining tool for machining the workpiece, whereby chips are removed from the workpiece, with the machining tool coming into direct contact with the lubricant during the machining and being lubricated by the lubricant; and
   a device for transforming the lubricant remaining in the workpiece into a the flowable state by melting the lubricant and for removing the lubricant from the workpiece.

19. An apparatus for machining a workpiece having at least one recess, at least one opening for introduction of the lubricant, and at least one further access opening, utilizing a lubricant having a flowable state, whereby chips are removed from the workpiece, comprising:
   a filler device for introducing the lubricant in the flowable state into the at least one recess of the workpiece;
   closure element for closing the access opening of the recess in the workpiece during introduction of the lubricant through the opening in the recess for introduction of the lubricant;
   at least one machining tool for machining the workpiece, whereby chips are removed from the workpiece, with the machining tool coming into direct contact with the lubricant during the machining and being lubricated by the lubricant; and
   a device for transforming the lubricant remaining in the workpiece into the flowable state by melting the lubricant and for removing the lubricant from the workpiece.

* * * * *

UNITED STATES PATENT AND TRADEMARK OFFICE
CERTIFICATE OF CORRECTION

PATENT NO.       : 6,890,131 B2
APPLICATION NO. : 10/455924
DATED            : May 10, 2005
INVENTOR(S)      : Alvarez-Vega It is certified that error appears in the above-identified patent and that said Letters Patent is hereby corrected as shown below:

In claim 2, "The method in accordance with claim 1, wherein the lubricant is introduced in the molten flowable state into the recess of the workpiece" should read -- The method in accordance with claim 1, wherein the lubricant is introduced in the flowable state into the recess of the workpiece --.

Signed and Sealed this

Twenty-seventh Day of February, 2007

JON W. DUDAS
*Director of the United States Patent and Trademark Office*